United States Patent
Dimeff

[11] 3,891,925
[45] June 24, 1975

[54] TACHOMETER CIRCUIT
[75] Inventor: John Dimeff, San Jose, Calif.
[73] Assignee: National Aeronautics and Space Administration Office of General Counsel-Code GP, Washington, D.C.
[22] Filed: Dec. 3, 1973
[21] Appl. No.: 420,812

[52] U.S. Cl. .................. 324/169; 324/16; 307/285
[51] Int. Cl. .................................................. G01p 3/12
[58] Field of Search............ 324/161, 169, 78 J, 16; 307/285, 318

[56] References Cited
UNITED STATES PATENTS
| | | | |
|---|---|---|---|
| 2,983,868 | 5/1961 | Silberbach | 324/169 |
| 3,005,155 | 10/1961 | Faria | 324/169 |
| 3,219,926 | 11/1965 | Dion | 324/169 |
| 3,314,007 | 4/1967 | Johnson | 324/173 |

OTHER PUBLICATIONS

J. A. Irvine; "No Moving Parts in Auto Tachometer;" Electronics (May 1966); pp. 77-78.

Primary Examiner—Alfred E. Smith
Assistant Examiner—Rolf Hille
Attorney, Agent, or Firm—Darrell G. Brekke; Armand G. Morin, Sr.; John R. Manning

[57] ABSTRACT

A precision passive tachometer circuit including a capacitor, a zener diode, and an ammeter combined in such a way as to provide a meter deflection that is directly proportional to the angular speed of the device monitored.

5 Claims, 3 Drawing Figures

3,891,925

TACHOMETER CIRCUIT

The invention described herein was made by an employee of the United States Government and may be used by or for the government for government purposes without the payment of any royalties thereon or therefor.

BACKGROUND OF THE INVENTION

1. Field of the Invention

The present invention relates generally to apparatus for the electronic measurement of rotational speed.

2. Discussion of the Prior Art

In the past, mechanical, stroboscopic, and electrical systems have been employed to measure angular motion. Heretofore, electrical systems used for measuring rotational speed have often required complicated circuits with numerous diodes and active elements, and a regulated power supply. See, for example, "Transistorized Tachometer," Electronic Circuit Design Handbook, Mactier Publishing Corporation, New York, page 154.

Zener diodes have been used to some extent in prior art electrical tachometers. These devices similarly rely on unnecessarily complex circuitry. In the circuit described in "Auto Tachometer Uses Transistor" by J. Cowan, Electronics, 31:33, pages 92–94, two diodes, one zener diode, and a transistor are required. The zener diode is simply used to compensate for variations in the 12-volt power supply. Tachometer circuits like those disclosed in U.S. Pat. No. 3,005,155 and U.S. Pat. No. 3,219,926 are encumbered with isolation circuits (a current-limiting resistor or a current-limiting resistor and an inductor) which are needed to prevent d-c loading of the impulse generating circuits.

SUMMARY OF THE PRESENT INVENTION

It is therefore a principal object of the present invention to provide a passive tachometer circuit with a high standard of accuracy but with a minimum number of components.

Briefly, in accordance with the present invention a rectangular waveform with a frequency proportional to the angular speed to be measured is fed into a circuit comprising a capacitor, a zener diode, and an ammeter. The capacitor alternately charges and discharges. The charge transferred to the capacitor through the ammeter for each input pulse is independent of the voltage appearing at the input terminals and is dependent only on the zener voltage and the capacitance (constants). The current flowing through the ammeter is a direct function of the input impulse rate (the angular speed), the capacitance of the capacitor, and the zener voltage. As the capacitance and zener voltage are constants, the current thus provides an accurate measure of the angular speed.

An advantage of the present invention is that it only requires three components.

Another advantage of the present invention is that it obviates the need for an input circuit comprising a current-limiting resistor.

These and other objects and advantages of the present invention will no doubt become apparent to those of ordinary skill in the art after having read the following detailed description of the preferred embodiment which is illustrated in the figures of the drawings.

DESCRIPTION OF THE PREFERRED EMBODIMENT

Figure 1:
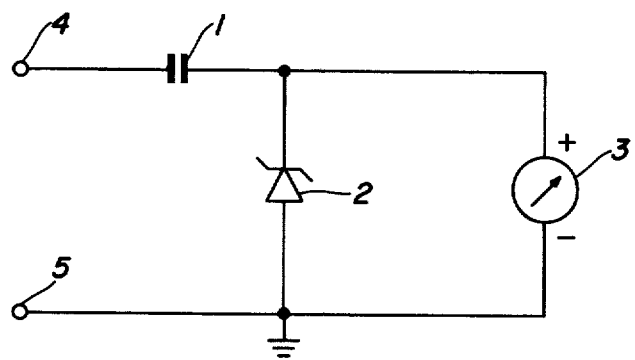
FIG. 1 is a circuit diagram schematically illustrating a tachometer circuit in accordance with the present invention.

The above-mentioned problems of circuit complexity may be resolved in accordance with the present invention by employing an apparatus as that depicted in FIG. 1. An unpolarized capacitor 1 is connected between input terminal 4 and the n terminal of zener diode 2. A d-c ammeter is connected in shunt with the zener diode 2. Input terminal 5 is connected to the p terminal of zener diode 2. A rectangular wave having a frequency proportional to the angular speed of the object that is to be measured is imposed on input terminals 4 and 5. A suitable waveform is illustrated in FIG. 2.

In selecting values for $R_m$ (meter resistance) and C (capacitance of capacitor 1), the time constant $R_mC$ should be small compared to the pulse duration (the period between the opening of the distributor points and their subsequent closing) at the highest angular speed of concern. Further, the zener voltage should be less than the input voltage (the amplitude of the input pulses), and the meter resistance, $R_m$, should be much greater than the dynamic resistance of zener diode 2, $R_z$.

Figure 2:
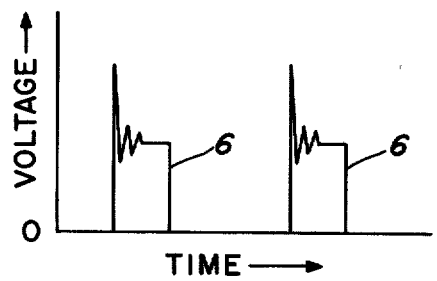
FIG. 2 is a graph depicting the waveform in the primary circuit of a typical automobile ignition system.

FIG. 2 depicts the voltage waveform found in the primary circuit of a conventional automobile ignition system and particularly the waveform found between the ignition points in the distributor. Pulses 6 are generated each time the points are opened. The frequency of pulses 6 is directly proportional to the engine speed. The pulse rate, of course, is a function of the cyclical configuration of the engine and the number of cylinders. In a four-cycle, one-cylinder engine an ignition pulse is generated every two revolutions of the crankshaft. In a four-cycle, eight-cylinder engine eight pulses are produced every two revolutions, etc.

Figure 3:
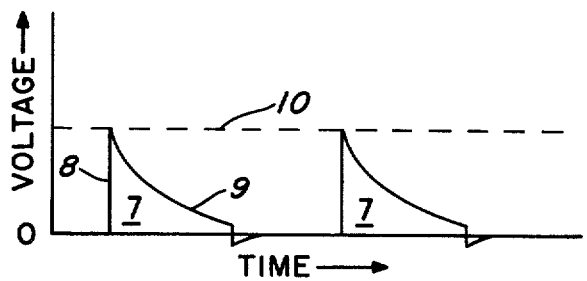
FIG. 3 is a graph depicting the waveform of the potential across zener diode 2.

In operation, the input terminals 4 and 5 are connected to the distributor points of the engine system to be measured. When the points are closed, the voltage between terminals 4 and 5 is zero. Each time the points are opened and closed a pulse 6 is fed to the input terminals. Input pulses 6 cause pulses 7 (FIG. 3) to be produced across zener diode 2 and ammeter 3. The time scales in FIGS. 2 and 3 are not identical. Pulses 6 and 7 actually have the same time duration. As the points are opened, the capacitor draws current through the zener diode and the meter. The capacitor is initially charged to the input voltage minus the zener voltage. The majority of the current initially passing through the capacitor is derived from the zener diode branch rather than the meter branch as the resistance of the zener diode is low compared to that of the meter when the voltage applied to the zener diode exceeds the zener voltage. The rise 8 of pulse 7 is very abrupt as the time constant $R_zC$ ($R_z$ is the dynamic resistance of the zener diode 2 and C is the capacitance of capacitor 1) is very small. The smaller current passing through meter 3 continues to flow increasing the charge across capacitor 1 until the voltage across the capacitor is greater than the difference between the applied voltage (from pulse 6) and the zener voltage. As soon as the voltage across the capacitor exceeds this difference, the voltage across the zener diode is insufficient to bias it to the zener breakdown voltage and the resistance of the diode becomes high compared to the resistance of the meter. Subsequently, the current flowing through the meter continues until the potential across the capacitor is equal to that of the applied rectangular wave. Thus, it is apparent that the voltage across the zener diode and the meter peaks at level 10, the zener voltage. The fall 9 of pulse 7 is basically controlled by the time constant $R_mC$ where $R_m$ is the resistance of the meter and C is the capacitance of capacitor 1.

When the voltage level of pulse 6 returns to zero, the charged capacitor applies a voltage across the zener diode. As the forward resistance to the zener diode is low and lower than the meter resistance, the capacitor discharges quickly and mainly through the zener diode.

The charge transferred to capacitor 1 through meter 3 for each pulse 6 depends only on the zener voltage and the capacitance of capacitor 1. The charge is independent of the input voltage. As the zener voltage and the capacitance are constant, the charge is constant. The product of the fixed charge per cycle and the number of cycles per unit time determines the current flowing in the meter so the reading is directly and linearly proportional to the frequency of the input pulses 6 and the angular speed of the engine. The meter may be calibrated in RPM's or other units of angular speed. Specifically, the current I through the meter is defined by the equation $$I = SNCV$$

where
S is the number of shaft revolutions per second,
N is the number of pulses delivered to the input per revolution,
C is the capacitance of capacitor 1, and
V is the zener voltage of diode 2.

C and V are constants so I is thus directly and linearly proportional to the frequency of the pulses.

Although the preferred embodiment was described in an automotive environment, it is to be understood that the present invention may be utilized with any repetitive rectangular waveform as long as the frequency of the wave is proportional to the angular speed to be measured. The particular waveform illustrated in FIG. 2 has positive pulses. If negative pulses are applied to input terminals 4 and 5, the polarity of the diode and the d-c ammeter must be reversed.

What is claimed is:

1. A tachometer circuit adapted for connection to a source of pulses, the frequency of said pulses being a direct function of the angular speed to be measured, consisting of:
   first and second input terminals for receiving said pulses;
   an unpolarized capacitor;
   a zener diode, said zener diode and said capacitor being connected in series, said capacitor and said zener diode being connected between said first and second input terminals;
   a d-c ammeter connected in shunt with said zener diode;
   a fixed charge being transferred to said capacitor for each of said pulses, said charge being a function of the zener voltage of said zener diode and the capacitance of said capacitor;
   said current flowing through said ammeter being dependent on only one variable, said pulse frequency, and thus said current being directly proportional to said speed.

2. A tachometer circuit as defined in claim 1 wherein said zener voltage is less than the amplitude of said pulses, the resistance of said ammeter, $R_m$, is much greater than the dynamic resistance of said zener diode, C is the capacitance of said capacitor, and the time constant $R_mC$ is much smaller than the duration of said pulses.

3. A tachometer circuit adapted for connection to the primary circuit of an engine ignition system, said primary circuit providing a series of pulses representative of the angular speed of said engine, consisting of:
   first and second input terminals for receiving said pulses;
   a zener diode;
   an unpolarized capacitor, said zener diode and said capacitor being connected in series between said input terminals;
   a d-c ammeter connected in parallel with said zener diode;
   the current I flowing through said meter being indicative of the speed of said engine and being defined as $$I = SNCV$$

where
S is the number of revolutions of said engine per second,
N is the number of pulses per revolution,
C is the capacitance of said capacitor, and
V is the zener voltage of said zener diode.

4. A tachometer circuit as defined in claim 3 wherein said zener voltage is less than the amplitude of said pulses, the resistance of said ammeter, $R_m$, is much greater than the dynamic resistance of said zener diode, C is the capacitance of said capacitor, and the time constant $R_mC$ is much smaller than the duration of said pulses.

5. A tachometer circuit adapted for connection to the breaker points of an engine ignition system consisting of:
   means for generating identical current pulses at the rate of one pulse for each time said breaker points are opened, said generating means comprising first and second input terminals for coupling to said breaker points, an unpolarized capacitor, and a zener diode, said zener diode and said capacitor being connected in series, said capacitor and said zener diode being connected between said first and second input terminals; and
   a d-c ammeter connected in parallel with said zener diode;
   the current I flowing through said meter being indicative of the speed of said engine and being defined as $$I = SNCV$$

where
S is the number of revolutions of said engine per second,
N is the number of pulses per revolution,
C is the capacitance of said capacitor, and
V is the zener voltage of said zener diode.

* * * * *

UNITED STATES PATENT OFFICE
CERTIFICATE OF CORRECTION

Patent No. 3,891,925　　　　　　　　　　Dated　June 24, 1975

Inventor(s)　John Dimeff

It is certified that error appears in the above-identified patent and that said Letters Patent are hereby corrected as shown below:

On the cover sheet cancel item " [73] Assignee: National Aeronautics and Space Administration Office of General Counsel-Code GP, Washington, D. C.".

Signed and Sealed this thirtieth Day of December 1975

[SEAL]

Attest:

RUTH C. MASON
*Attesting Officer*

C. MARSHALL DANN
*Commissioner of Patents and Trademarks*